United States Patent [19]

Monch

[11] Patent Number: 4,706,709

[45] Date of Patent: Nov. 17, 1987

[54] MIXING VALVE ASSEMBLY

[75] Inventor: Heiner Monch, Kenn, Fed. Rep. of Germany

[73] Assignee: American Standard Inc., New York, N.Y.

[21] Appl. No.: 838,859

[22] Filed: Mar. 12, 1986

[30] Foreign Application Priority Data

Mar. 16, 1985 [DE] Fed. Rep. of Germany ....... 3509649
Mar. 18, 1985 [DE] Fed. Rep. of Germany ....... 3509648

[51] Int. Cl.⁴ .......................... F16K 11/22; F16K 3/26
[52] U.S. Cl. ...................................... 137/597; 251/310
[58] Field of Search ............... 137/597, 637.3; 251/80, 251/310, 312

[56] References Cited

U.S. PATENT DOCUMENTS

| | | | |
|---|---|---|---|
| 1,563,372 | 12/1925 | Kantor | 251/80 X |
| 1,615,730 | 1/1927 | Vallier | 137/597 X |
| 2,847,027 | 8/1958 | Kumpman | 137/597 |
| 2,959,183 | 11/1960 | Jordan | 137/597 X |
| 3,129,725 | 4/1964 | Lapsley | 251/80 X |
| 3,329,162 | 7/1967 | Sanford | 137/637.3 X |
| 3,823,742 | 7/1974 | Von Corpon | 137/597 X |
| 3,840,046 | 10/1974 | Busquets | 137/597 X |
| 4,478,249 | 10/1984 | Fleischmann | 137/625.5 |

FOREIGN PATENT DOCUMENTS

| | | | |
|---|---|---|---|
| 0071729 | 6/1982 | European Pat. Off. | 137/597 |
| 2126114 | 12/1972 | Fed. Rep. of Germany | 137/597 |
| 3243750 | 5/1984 | Fed. Rep. of Germany | . |

Primary Examiner—Martin P. Schwadron
Assistant Examiner—Stephen M. Hepperle
Attorney, Agent, or Firm—James J. Salerno, Jr.; Robert G. Crooks; John P. Sinnott

[57] ABSTRACT

A single lever mixing valve assembly and an appliance valve assembly for sinks or the like are mounted in a valve housing. A mixing valve cartridge having hot, cold and mixed water passages and an insert having hot, cold and mixed water conduits operably coupled thereto. The insert includes a shut-off valve having a water passageway coupled to at least one of the hot and cold water conduits and an appliance water discharge conduit. The shut-off valve, the insert, the valve cartridge and means to control the shut-off valve and valve housing are coaxially arranged.

7 Claims, 4 Drawing Figures

MIXING VALVE ASSEMBLY

BACKGROUND OF THE INVENTION

1. Field of the Invention

The invention relates to a mixing valve assembly, particularly, a single-lever assembly for sinks or the like, comprising an assembly casing containing an insert, which may be replaceable, with conduits for hot and cold water and at least one conduit for connecting a household machine. A control valve cartridge and/or shut-off valve is coupled to the insert.

2. Description of Related Art

A single-lever mixing valve with an insertable connecting piece molded onto the body of the valve assembly is shown in No. EP-0071729. It comprises a mixing means for the water fed to an outlet and an additional connection for a household machine with a valve device. The passages for hot and cold water supply and that for the additional connection are arranged in the insertable connecting piece. The mixing means for the water fed to the outlet includes a single-lever mixing valve, and a second valve is provided for the machine connection.

A disadvantage of this type of mixing valve is that the second valve for the machine connection is provided in the body of the assembly, an arrangement which is expensive to produce and takes up too much room. Another disadvantage of this type of mixing valve considerably limits the shape and technical design.

A single-lever mixing valve with an assembly casing accommodating the lever-actuated mixing means is shown in No. DE-OS 32 43 750. The casing is provided with an insertable connecting piece, containing the supply lines for hot and cold water and at least one appliance conduit linked with one of the supply lines. A shut-off valve, also located on the casing in the region between the mixing means and the connecting piece, is provided to stop water from passing from the supply line in question into the appliance conduit. The valve is arranged in a separate ring enclosing that region. Here again, because the shut-off valve is arranged on the mixing valve assembly, the main disadvantages experienced are those mentioned with regard to No. EP-0071729.

So-called kitchen assemblies of this type have been known and much sought after for a long time. They are often provided with a spray hose which is held in the outlet component and can be pulled out of it. However, the disadvantage of these kitchen assemblies is that they are only suitable for normal mixed water operation, that is to say, they do not have a shut-off valve working together with an additional outlet for connection to a household machine, e.g. a dishwasher or washing machine. In order to operate such machines, either separate valves, pipes and couplings are required to be installed or the existing kitchen assemblies are exchanged for a new valve assembly having a check valve and is designed to connect a household machine. An additional connecting pipe, e.g. for cold water, operates together with the shut-off valve and water valve. To extend or convert an existing kitchen valve assembly, it is either not possible or it is relatively expensive and it would require additional space which makes the installation difficult or impossible to do.

SUMMARY OF THE INVENTION

The present invention overcomes the problems and disadvantages discussed above by providing a mixing valve assembly which is simple in construction, reliable in operation, and which is readily convertible. The problem is solved by providing an insert, which may be replaceable, that is positioned in the valve casing assembly and to which the shut-off valve is operably coupled. An actuating member is located at the periphery of the valve assembly to actuate the shut-off valve.

The valve assembly according to the invention, the shut-off valve for connecting one or more household machines and the insert, are separate components and are housed in the casing assembly. The valve assembly is of a simple construction and it is easy to manufacture and assemble.

DESCRIPTION OF THE DRAWINGS

By way of example, the invention is illustrated in the accompanying drawings, in which.

DESCRIPTION OF THE PREFERRED EMBODIMENT

Figure 1:
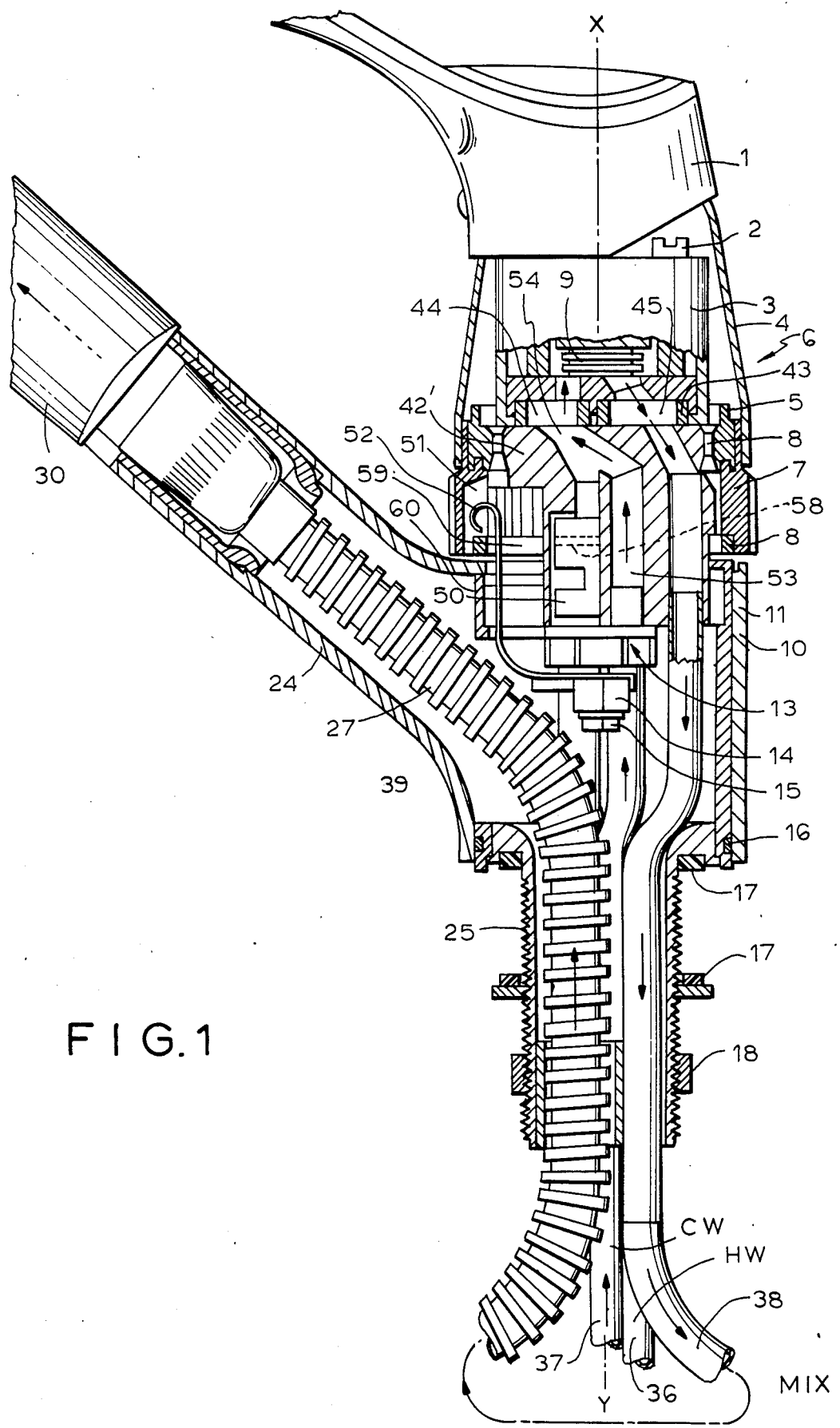
FIG. 1 is an elevational view of the mixing valve assembly of the invention showing an additional connecting pipe and shut-off valve.
Figure 3:
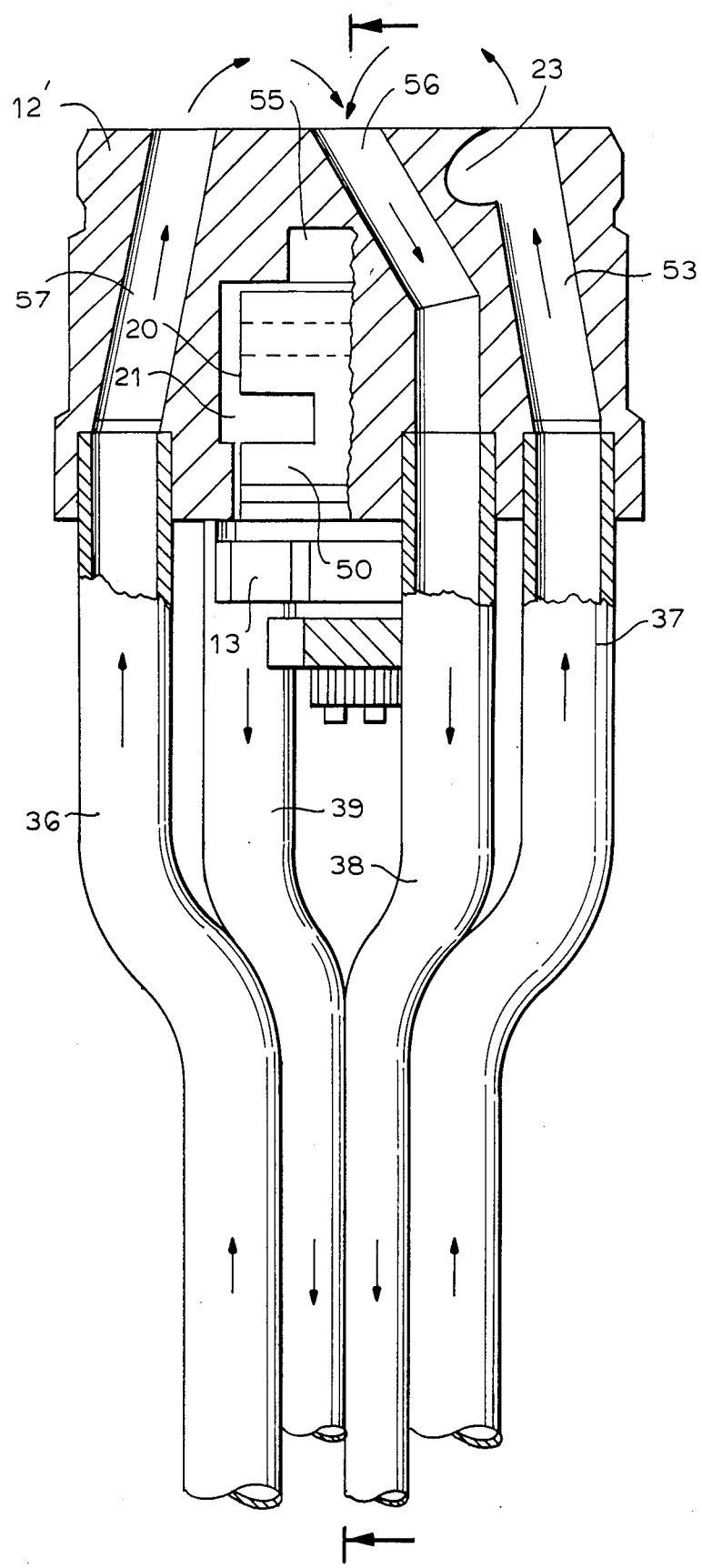
FIG. 3 is an elevational view, partly in section, of the insert shown in FIG. 1.
Figure 4:
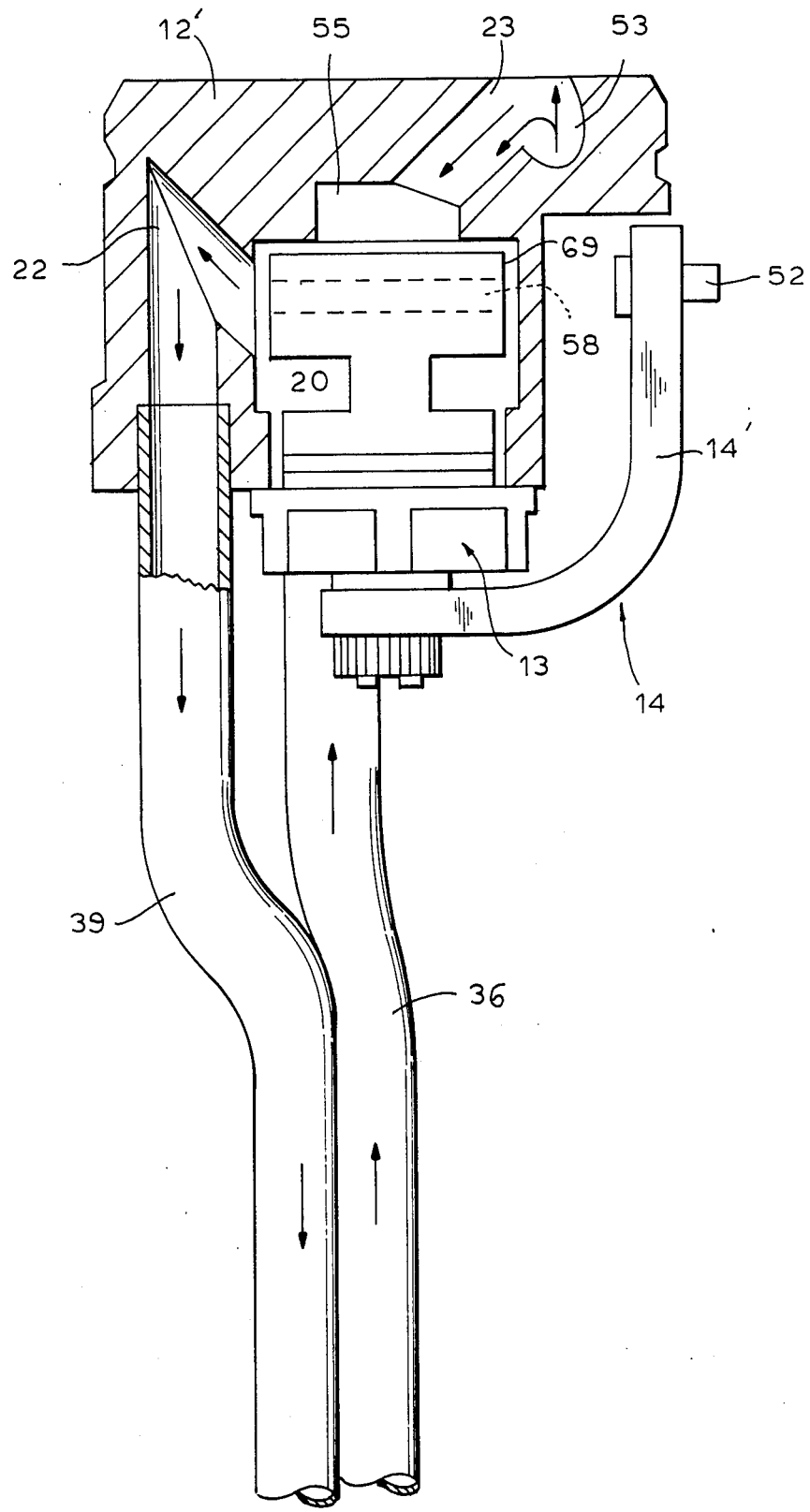
FIG. 4 is an elevational sectional view of the insert taken along the line 4—4 of FIG. 3.

The single lever mixing valve assembly, shown in FIGS. 1, 3 and 4 is particularly useful for a kitchen sink or the like and is provided with a hand lever 1 to adjust the volume and temperature of the water. Lever 1 is operably coupled to control cartridge 3 of the type that is shown in No. DE-OS 1 550 060 which corresponds to U.S. Pat. No. 3,433,264. Insert 12' is detachably coupled to inner casing 60 as by screws, now shown. Control ring 7 is operably coupled to shut-off valve 13 and rotates between upper and lower slide rings 8 which are carried by inner casing 60 and upper rim of control ring 7. Control ring 7 and slide rings 8 are detachably coupled by threaded clamp ring 5 as by corresponding threads formed on the upper section of insert 12', not shown. Cartridge 3, fitted with static seals 43 which are disposed around hot and cold water inlet ports 44 and outlet port 45, is mounted in watertight engagement to insert 12' by screws 2. Insert 12' and cartridge 3 are positioned in and are operably mounted to casing assembly 6. Cold water conduit 37, hot water conduit 36 and outlet conduit 38 are operably coupled to inlet ports 44 and outlet port 45, respectively, of cartridge 3 through corresponding passageways formed through insert 12'. Outlet conduit 38 carries hot and/or cold water discharged from mixing chamber 9 of cartridge 3 to a sink or the like. Assembly casing 6 includes cap 4, control ring 7, outlet ring 10 and an inner casing 60, as shown in FIG. 1.

Shut-off appliance valve 13 and an additional water connection are screwed in water tight engagement into the insert 12' from below, shown in FIGS. 1, 3 and 4. shut-off valve 13, in known manner, comprises a cartridge casing 50 containing two ceramic sealing discs 58 and 59 positioned in face-to-face sealing engagement. Control ring 7 is operably coupled to shut-off valve 13 by a lock screw 15 of an arm 14' made of spring steel plate 14'. One end 52 of arm 14' is disposed in chamber 51 formed between insert 12' and ring 7 and shifts circumferentially when control ring 7 is rotated either clockwise or counter clockwise. The water flow, as shown by the direction of the arrows in FIGS. 3 and 4, passes through conduit 37 and a passageway 53 formed in insert 12' to the appropriate hot and/or cold water inlet port 44. Supply passage 53 has a branch 23, through which cold water is diverted to an inlet port 55 of the shut-off valve 13, from where it flows, when shut-off valve 13 is in its open position, through outlet port 21 and branch 22 into conduit 39 to a household machine, not shown. Hot water conduit 36 is coupled to supply passage 57 and the other appropriate inlet port 44. The single lever mixing valve, shown in FIG. 1, is fitted with an insertable connecting piece 25 and coupled to a sink or the like, not shown, by a pair of resilient seal washers, such as two rubber discs 17 and a lock nut 18.

Outlet passage 24 is rotatably mounted on slide ring 11. The spray house 27 is coupled to conduit 38 and is housed in outlet passage 24. Spray hose 27 can be pulled out by means of a hand spray 30. Outlet passage 24 is fitted with an O-ring 16 at its lower end to facilitate rotation between inner casing 60 and outlet ring 10. As is evident, control cartridge 38, insert 12', shut-off valve 13 and control ring 7 are coaxially assembled.

Also, as shown in FIG. 1, the upper sections of inner casing 60 and outlet ring 10 of casing assembly 6 and the lower section of insert 12' and shut-off valve 13 provide a chamber of sufficient size to house connecting pipes or conduits and the spray hose that pass downward through connecting piece or coupling 25.

Figure 2:
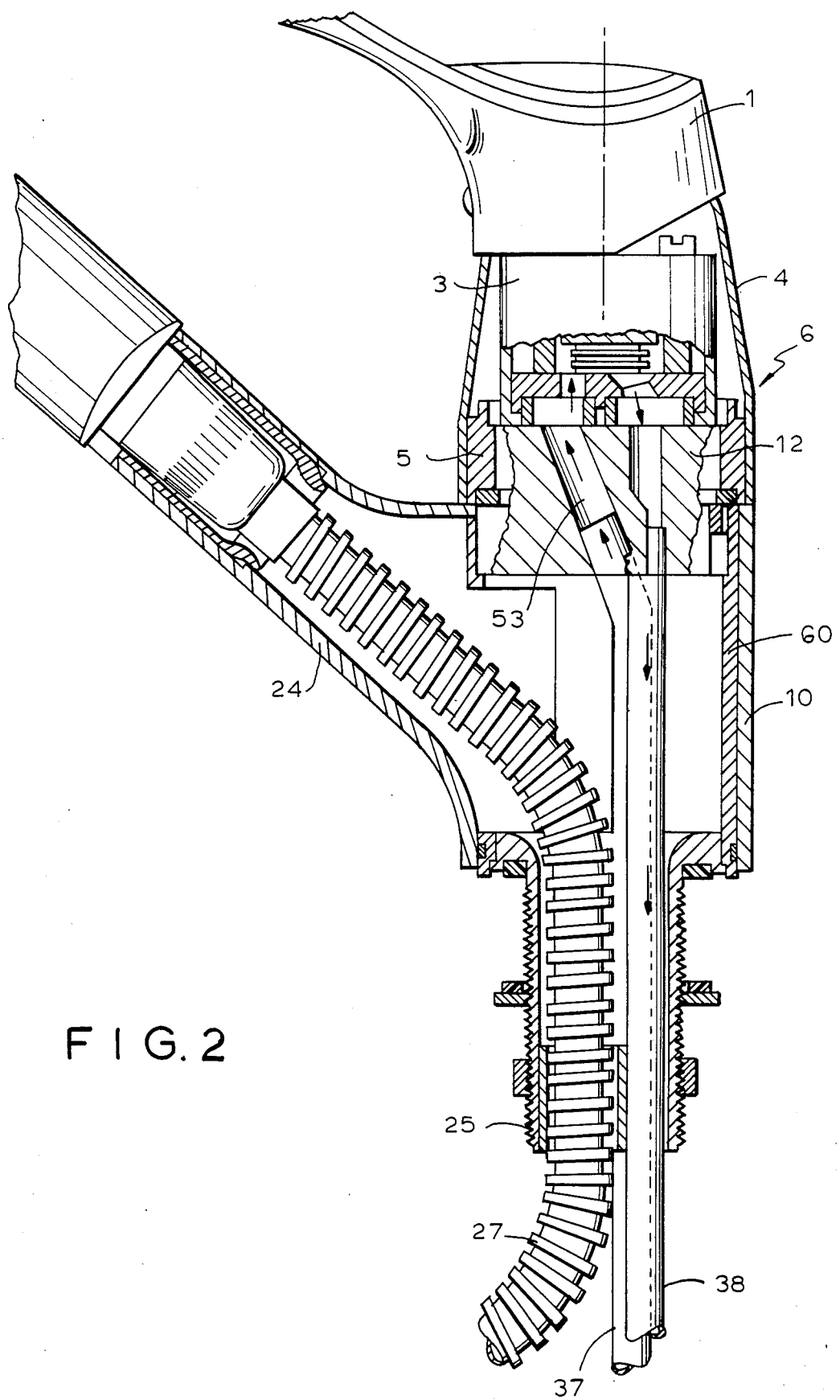
FIG. 2 is an elevational sectional view of a mixing valve assembly without the shut-off valve of FIG. 1.

When the mixing valve assembly of FIG. 2 is converted to the mixing valve assembly of FIG. 1, insert 12 of FIG. 2, which is suitable only for a standard type single-lever mixing valve, is removed and is replaced by insert 12' of FIG. 1. The mixing valve of FIG. 2 is converted by first disconnecting hot and cold water source lines and their corresponding conduits 36 and 37. Also, the spray hose 27 is disconnected from conduit 38. Hand lever 1, cap 4, valve cartridge 3 and clamp ring 5 are uncoupled. Insert 12, which is detachably mounted as by screws, is removed from inner casing 60, together with conduits 36, 37 and 39, from the valve casing assembly 6. Conduits 36, 37 and 38, shut-off valve 13 and control member 14, are assembled to insert 12', as shown in FIG. 1. The assembled insert 12' is operably coupled to inner casing 60. Control ring 7, with its lower and upper slide ring 8, are positioned around and are operably mounted to insert 12' by threaded clamp ring 5. Valve cartridge 5 is mounted on insert 12', and cap 4 is mounted around clamp ring by means of a snap or friction fit. Spray hose 27 and the household machine are coupled to their respective conduits 38 and 39, and the hot and cold water sources are coupled to their respective conduits 36 and 37 of the mixing valve assembly.

The construction of the single-lever mixing valve, as described and illustrated herein, is by way of example and should not be restricted thereto. Variations of design and arrangement of the parts can be made without departing from the spirit of the invention. For example: a button type or a rocker type or a sliding switch could be substituted in place of control ring 7 with appropriate changes in design of casing assembly 6. Also, the design of shut-off valve 13 could be varied to provide mixed or hot water by appropriately tapping the corresponding passageways of insert 12'.

It is claimed:

1. In combination, a mixing valve assembly and an appliance valve assembly comprising:
   a valve housing having said mixing valve and appliance valve assemblies mounted therein;
   said mixing valve assembly including valve means in the form of a valve cartridge and having hot and cold water passages and a mixed water discharge passage;
   an insert mounted in said housing including hot and cold water inlet conduits and a mixed water conduit coupled, respectively, to said hot and cold water passages and said mixed water discharge passage of said cartridge valve;
   said insert including a shut-off valve having at least one water passageway coupled to at least one of said hot and cold water conduits of said insert and a water discharge conduit to be coupled to an appliance;
   said shut-off valve having means to control water flow to said appliance from an opened to a closed position;
   said mixing valve assembly having means to control water flow through said mixed water discharge passage of said mixing valve independently of said appliance valve means; and
   said shut-off valve, said insert, said valve cartridge, said means to control said shut-off valve and said valve housing are arranged coaxially.

2. The assembly of claim 1 wherein said means to control water flow through said shut-off valve is in the form of a control ring.

3. The assembly of claim 1 wherein said shut-off valve is mounted in a chamber formed in said insert and said chamber being coupled to said at least one water passageway to provide water for the household machine.

4. The assembly of claim 3 wherein said shut-off valve includes a vertically extending arm, one end of which is coupled to said shut-off valve control means, and the other end is coupled to said shut-off valve.

5. The assembly of claim 1 wherein said valve housing includes an outlet conduit in which is housed a spray having a flexible conduit operably coupled to said mixed water discharge conduit of said insert.

6. The assembly of claim 1 wherein said outlet conduit is rotatably mounted on said valve housing.

7. The assembly of claim 1 wherein said insert is interchangeable.

* * * * *